US007231870B2

(12) United States Patent
Lowe et al.

(10) Patent No.: US 7,231,870 B2
(45) Date of Patent: Jun. 19, 2007

(54) DRIPLESS FUNNEL ASSEMBLY

(75) Inventors: Kevin G. Lowe, Virden, IL (US);
Randy D. Pope, Edinburg, IL (US);
Michael D. Marsaglia, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 410 days.

(21) Appl. No.: 10/476,862

(22) PCT Filed: May 6, 2002

(86) PCT No.: PCT/US02/14317

§ 371 (c)(1),
(2), (4) Date: May 5, 2004

(87) PCT Pub. No.: WO02/089646

PCT Pub. Date: Nov. 14, 2002

(65) Prior Publication Data

US 2004/0221724 A1 Nov. 11, 2004

(51) Int. Cl.
*A47J 31/24* (2006.01)
(52) U.S. Cl. .............................. 99/299; 99/300; 99/307
(58) Field of Classification Search .................. 99/299, 99/283, 306, 307, 300, 304; 141/335, 351, 141/344, 345, 337; 251/95, 113, 331; 426/433
See application file for complete search history.

(56) References Cited

U.S. PATENT DOCUMENTS

| 4,303,196 | A | 12/1981 | Raines et al. ................. 99/295 |
| 4,662,271 | A | 5/1987 | Woltermann .................. 99/280 |
| 4,882,983 | A | 11/1989 | Pastrick ........................ 99/295 |
| 4,893,552 | A | 1/1990 | Wunder et al. ............... 99/299 |
| 5,063,837 | A | 11/1991 | Precht .......................... 99/295 |
| 5,085,135 | A | 2/1992 | Collignon .................... 99/299 |
| 5,098,062 | A | 3/1992 | Lungu .......................... 99/283 |
| 5,133,247 | A | 7/1992 | Pastrick ....................... 99/295 |
| 5,251,541 | A | 10/1993 | Anson et al. ................. 99/295 |
| RE34,482  | E | 12/1993 | Pastrick ....................... 99/295 |
| 5,377,299 | A | 12/1994 | Anson et al. ................. 99/299 |
| 5,515,771 | A | 5/1996 | Smit ............................ 99/280 |
| 5,619,904 | A | 4/1997 | Di Nunzio et al. ........... 99/295 |
| 5,687,637 | A | 11/1997 | Brookshire et al. ........... 99/295 |
| 5,865,095 | A | 2/1999 | Mulle .......................... 99/299 |
| 5,901,635 | A | 5/1999 | Lucas et al. .................. 99/283 |
| 5,964,143 | A | 10/1999 | Driscoll et al. ............... 99/295 |
| 6,003,734 | A | 12/1999 | Oh ............................... 99/295 |

FOREIGN PATENT DOCUMENTS

NL        1000322 C6    11/1996

OTHER PUBLICATIONS

Derwent database English language translation of Document AA reference.

*Primary Examiner*—Reginald L. Alexander
(74) *Attorney, Agent, or Firm*—Barnes & Thornburg LLP

(57) ABSTRACT

A flow control assembly (20) for use in conjunction with a funnel assembly (22) of a brewing system. The flow control assembly comprises a body (28) which has a magnetic portion (26) and a stopper (24). The body is desirably attached to a portion of the funnel assembly such as a basket (48) contained within the funnel assembly by a couple (42). The flow control assembly further includes a magnetic actuator (90) and a controller (104) connected to the brewing system for controllably displacing the stopper relative to an outlet aperture in a wall of the funnel assembly.

38 Claims, 7 Drawing Sheets

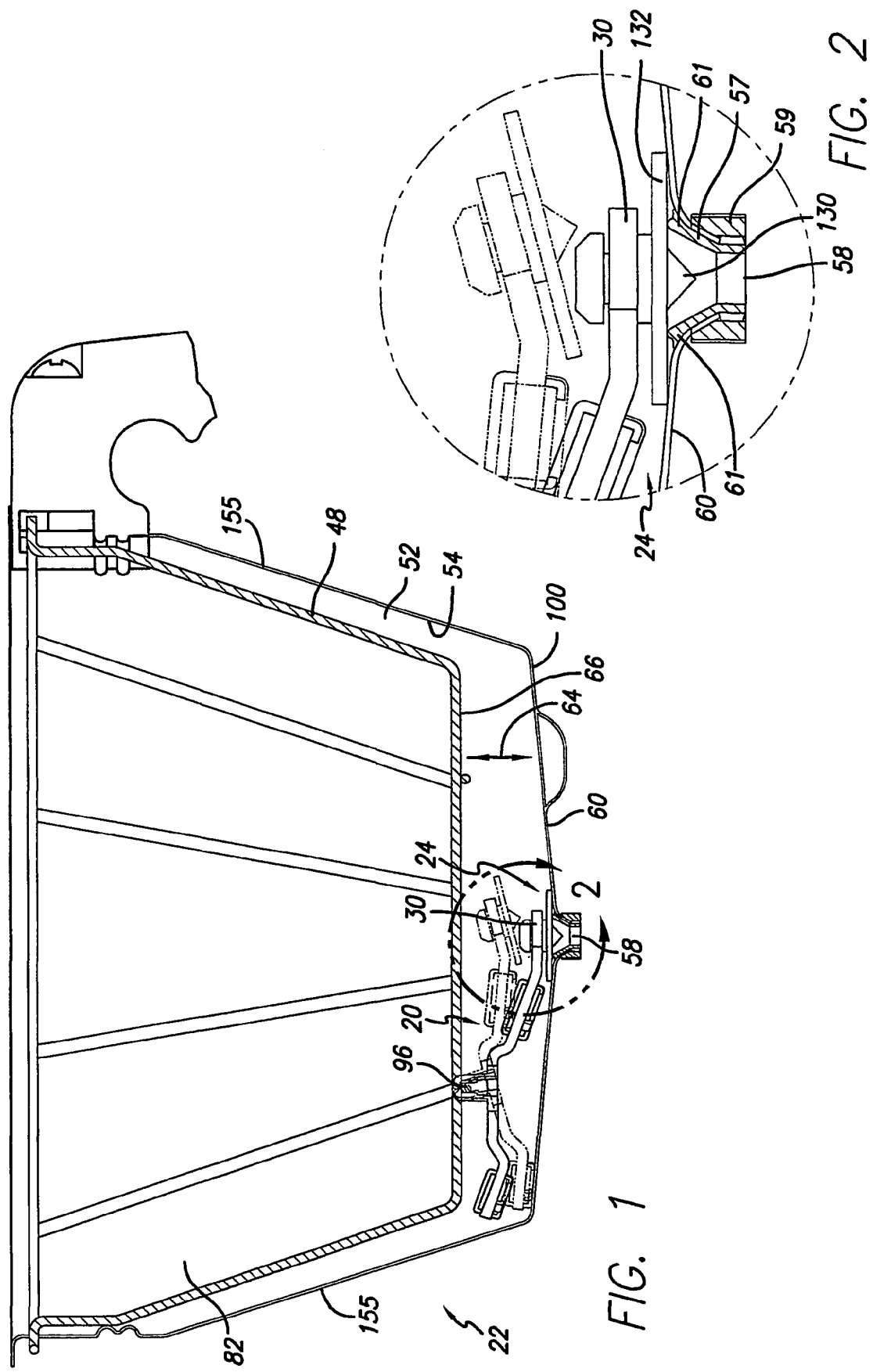

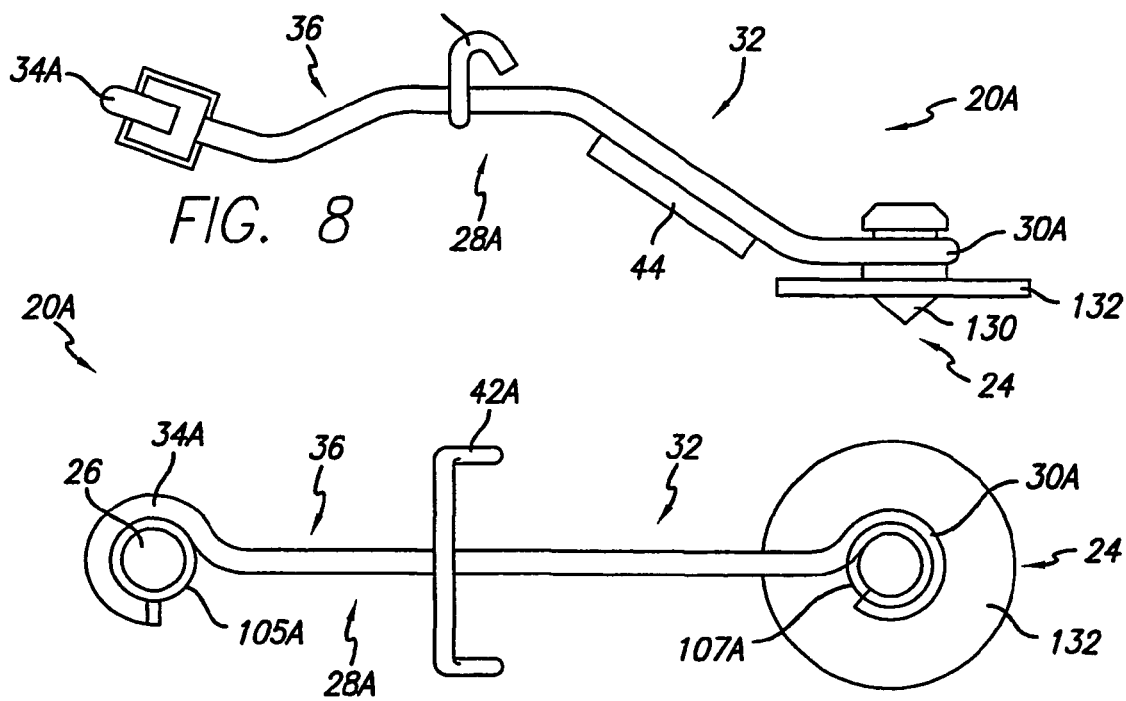
FIG. 8
FIG. 9
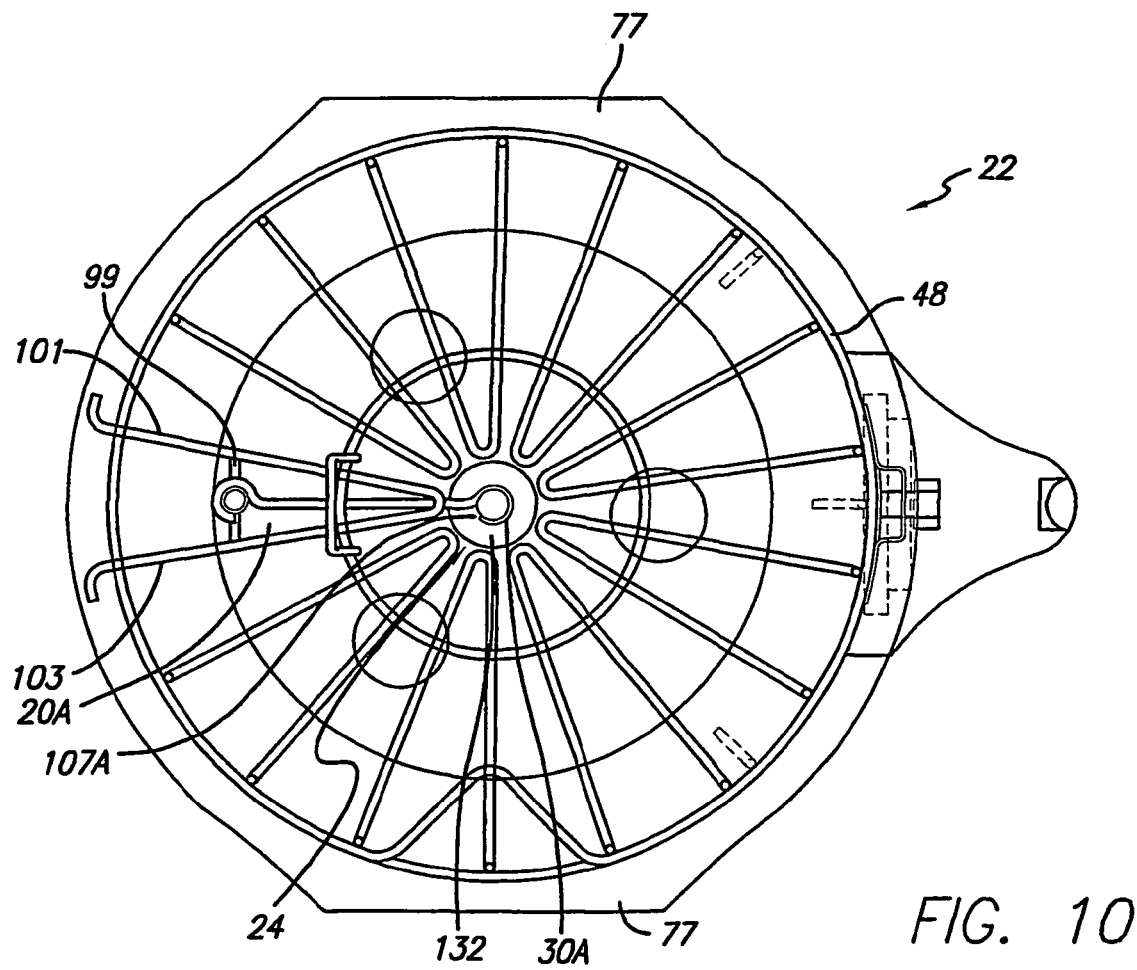
FIG. 10

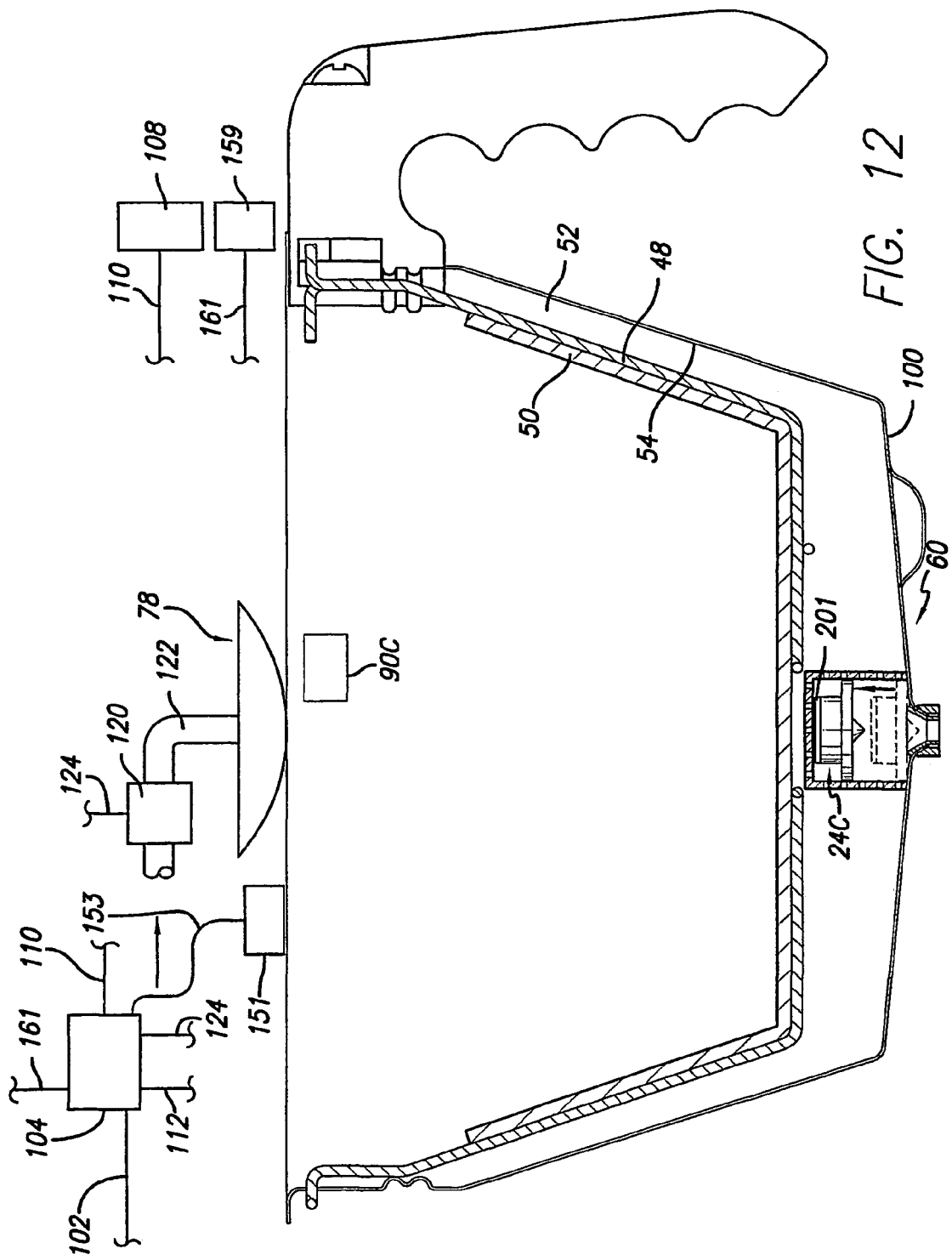

DRIPLESS FUNNEL ASSEMBLY

BACKGROUND

The present disclosure relates to a device for use with a beverage making apparatus and more particularly to a device which is used to prevent or control the outflow of liquid from a beverage substance holder such as a funnel assembly.

A variety of beverage making devices are available to provide some form of control for liquid flowing into and out of a beverage substance holder. By way of review, a beverage substance holder retains a filter material or structure and a charge of beverage making substance, for example, ground coffee or tea material. Water is dispensed into the beverage substance holder so as to infuse the beverage making substance and cause a beverage to be extracted.

Devices have been designed which control the flow of water into the beverage substance holder. Also, devices have been created which prevent the flow of beverage out of the substance holder such as when the beverage container is removed from beneath the holder.

For example, drip-stopping devices used in the home beverage industry have been designed which allow the beverage container, or "coffee pot", to be removed from a brewing apparatus. The drip-stopping device prevents coffee from continuing to flow from the funnel assembly after the coffee pot is removed. In this situation, a mechanical interface with the coffee pot results in a covering of or plugging of an outlet aperture in the brewing funnel assembly assembly.

One of the problems that arises with such drip-stopping devices is that after the funnel assembly is removed from the brewer, the drip-stopping mechanism no longer functions. For example, if the drip-stopping mechanism requires the coffee pot to activate mechanical structures on the funnel assembly assembly. Once the funnel assembly is removed from the brewing system and is no longer contacting the coffee pot, the drip-stopping feature cannot function.

Further, the drip-stopping devices currently in use are generally not controllable. In this regard, the funnel assembly and drip-stopping mechanism described above will not be controllable other than by use of the coffee pot activating the mechanical structures. No known devices controllably operate the opening and closing of the outlet aperture in the funnel assembly.

It would be desirable to provide some degree of control of the flow, through the outlet aperture in the funnel assembly, so as to provide additional control relating to the characteristics of the brewed beverage. For example, such an apparatus could be used to control the steep time associated with a particular beverage brewing substance such as tea or coffee. When used with coffee, different flavor profiles or flavor characteristics could be obtained. Similarly, with tea, different flavor profiles and characteristics could be obtained through controllably steeping the tea through intermittent opening and closing of the outlet aperture.

The intermittent control or pulse brewing by the device could be used to pulse brew a beverage from the funnel assembly, thereby limiting the amount of brewed beverage that is pulsed from the funnel assembly during a given brewing cycle. This may result in extended contact between the ground coffee or tea particles and the brewing water, thereby altering the characteristics extracted from the substance.

SUMMARY

The present disclosure envisions a flow control assembly which is attached to the beverage substance holder or funnel assembly to controllably open and close an outlet aperture in the funnel assembly. The flow control assembly may be attached to the funnel assembly as well as an internal structure such as a wire frame structure or basket used to support a filter material.

The present disclosure envisions using a stopper and a magnetic portion which are connected to each other, or as a single structure, for opening or closing the outlet aperture in the funnel assembly. The magnetic portion is associated with an attractive or repulsive magnetic actuator such as an electromagnet attached to the beverage making apparatus or other structure so that the magnetic portion is moved by the magnetic actuator. The movement of the magnetic portion by the actuator either opens or closes the outlet aperture by displacing the stopper attached thereto.

The present disclosure also envisions using a controllable actuator in combination with the magnetic portion. An electromagnet may be used to controllably engage and disengage the magnetic portion from the actuator. In this regard, the present disclosure can controllably open and close the outlet aperture to control the flow of the beverage passing therethrough.

The present disclosure also envisions providing a flow control assembly and actuator which are retrofittable to an existing beverage system and beverage substance holder.

The present disclosure also envisions a flow control assembly which can be mounted internally of the beverage substance holder or externally thereof. The flow control assembly in either configuration includes a stopper which is attached or otherwise connected to a magnetic portion to provide the desired structure and function of the present disclosure.

The present disclosure also envisions controllable devices associated with the flow control assembly to provide the controllable dispensing of beverage from the beverage substance holder or funnel assembly.

BRIEF DESCRIPTION OF THE DRAWINGS

FIG. 1 is a cross-sectional view of a beverage substance holder or funnel assembly showing a funnel assembly in which a wire-form structure or basket is positioned, with a flow control assembly of the present disclosure retained therein for controllably opening and closing an outlet aperture in the funnel assembly;

FIG. 2 is an enlarged cross-sectional view of the stopper portion of the flow control assembly of FIG. 1 showing the stopper portion engaging the outlet aperture;

FIG. 8 is an enlarged side-elevational view of the flow control assembly;

FIG. 9 is a top plan view of the flow control assembly as shown in FIG. 8; and

FIG. 10 is a top plan view of the brewing substance holder as shown in FIG. 7 similar to that as shown in FIG. 4;

FIG. 12 is an enlarged cross-sectional view of another embodiment of the flow control assembly of FIG. 1 showing the stopper disengaged from the outlet aperture.

DETAILED DESCRIPTION

Figure 3:
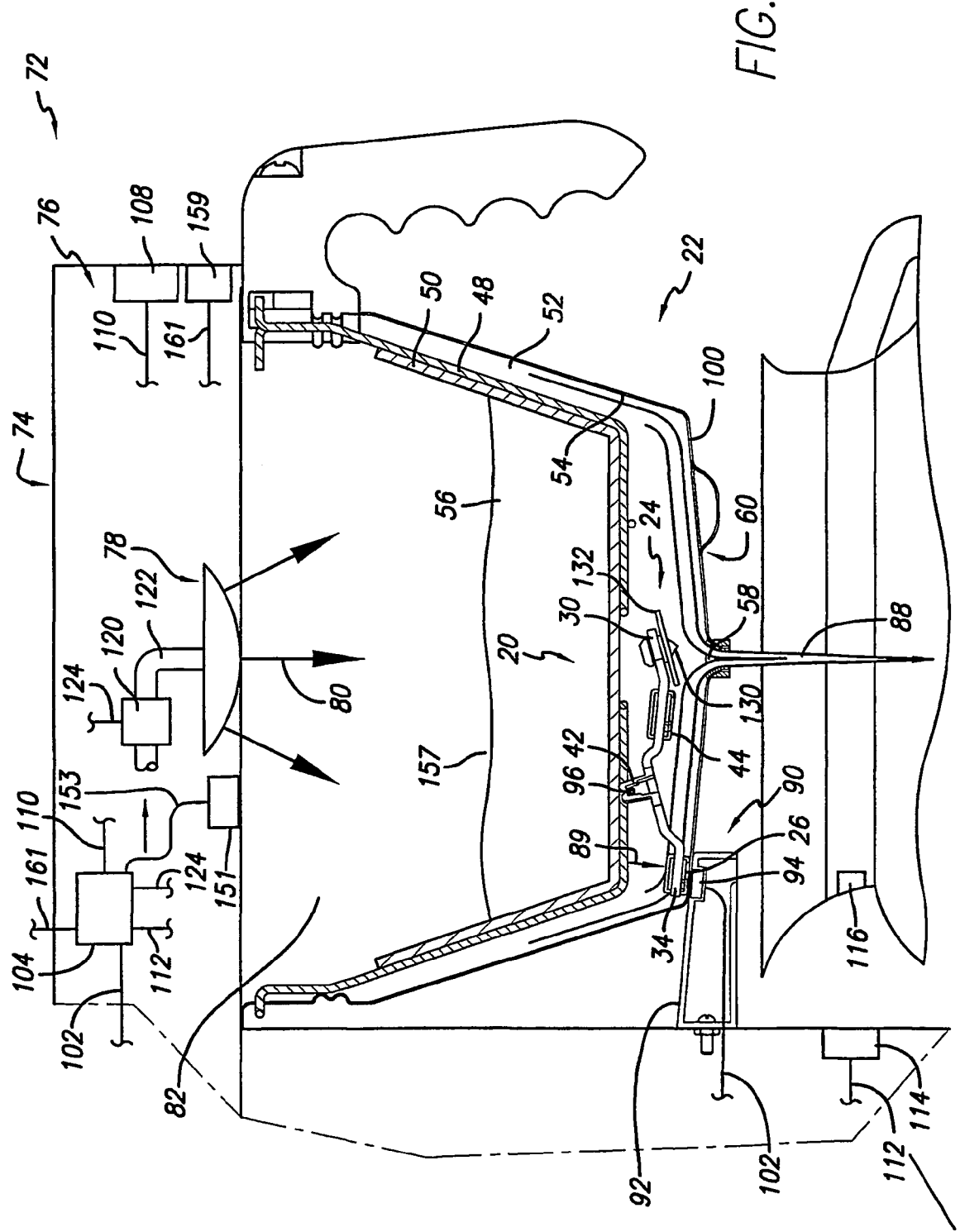
FIG. 3 is a diagrammatic cross-sectional view similar to that as shown in FIG. 1 in which the beverage substance holder has been attached to a beverage system and shows a magnetic portion of the flow control assembly engaged with an actuator retained on the beverage system to disengage the stopper of the stopper assembly from the outlet aperture.
Figure 4:
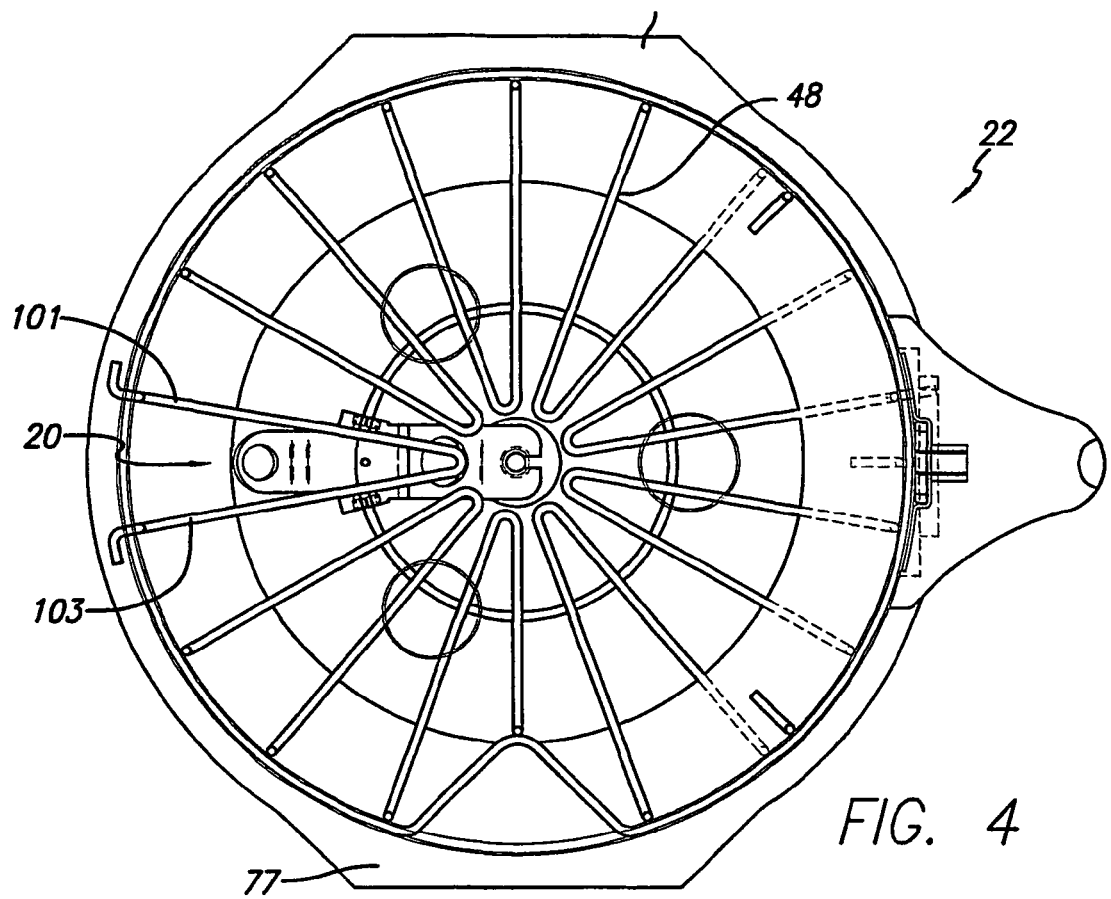
FIG. 4 is a top plan view of the brewing substance holder as shown in FIG. 1 showing a flow control assembly attached to a wire frame basket contained within the brewing substance holder.
Figure 6:
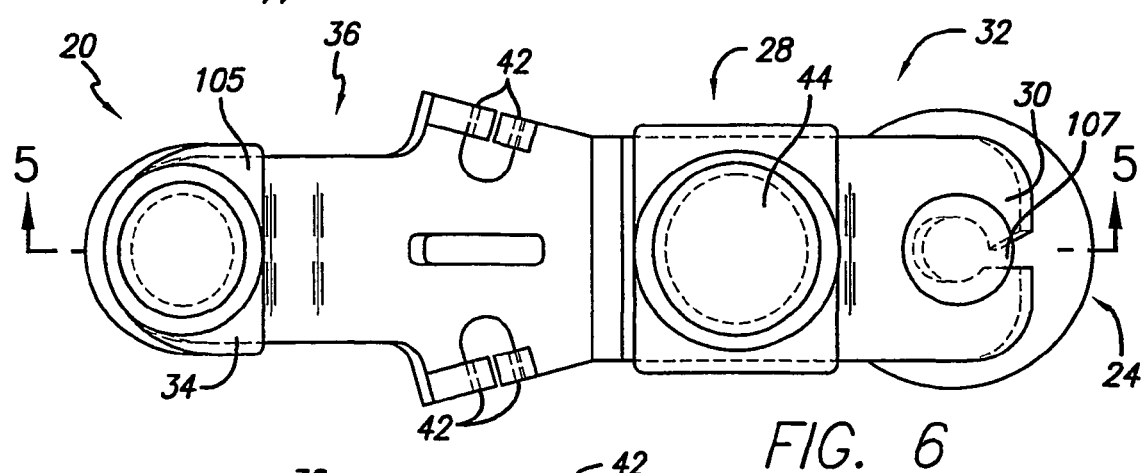
FIG. 6 is an enlarged top plan view of the flow control assembly as shown in FIGS. 1, 4 and 5.
Figure 5:
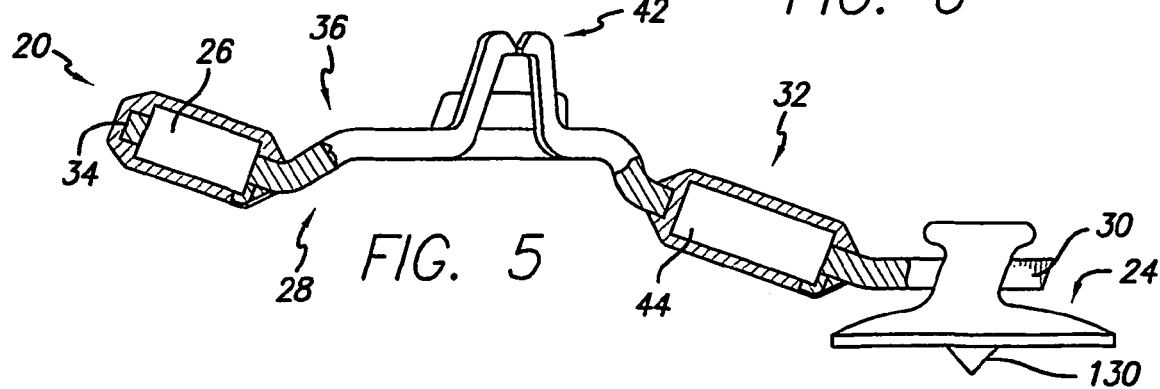
FIG. 5 is an enlarged side-elevational view of the flow control assembly as shown in FIGS. 1 and 4.

The present disclosure is generally shown in FIG. 1 in which a flow control assembly or means for controlling fluid flow 20 is used in conjunction with a beverage substance holder or funnel assembly 22 having walls 155 with an interior surface 54 and an exterior surface 100. As shown in FIGS. 5 and 6, the flow control assembly 20 includes a stopper 24 and a magnetic portion 26 which are attached or coupled to each other. In the present embodiment as shown in FIGS. 1–6 a retainer or body 28 holds the stopper 24 on a stopper mount 30 on a stopper end 32 of the body 28. The magnetic portion 26 is retained on a magnet mount 34 on magnet end 36 of the body 28. Clearance or passages 105, 107 are provided on the mounts 34, 30 to allow the respective magnetic portion 26 and stopper 24 to be snapped into position therein. It is envisioned that the magnetic portion 26 and stopper 24 could also be molded into place on the respective ends 36, 32 of the body 28 by use of an over molded plastic material. Attached to the body 28 is a coupler 42 positioned there-between. In the embodiment as shown, a counterweight 44 is attached proximate to the stopper 24 to provide balancing weight relative to the coupler 42.

As shown in FIG. 1, a wire-formed structure or basket 48 is retained in the brewing substance holder or funnel assembly 22. The basket 48 is retained in the funnel assembly 22 in order to hold a filter material or filter paper 50 therein. The basket 48 provides a space 52 between the interior surface 54 of the funnel assembly 22 and the filter material 50 to space the filter material away from an interior surface 54 of the funnel assembly 22. With reference to FIG. 3, when a charge of beverage making substance 56 such as ground coffee is placed in the filter material 50, and a quantity of water is dispensed over the ground coffee to infuse it to produce a beverage 88 such as coffee, the space 52 provides greater surface area for the beverage to seep from the filter material 50 into the funnel assembly 22. The funnel assembly 22 includes an outlet aperture 58 generally positioned in a bottom area 60 thereof.

As best seen in FIG. 2 the outlet aperture 58 of funnel assembly 22 is further formed by an internal threaded insert 57 and an external threaded insert 59. The external threaded insert 59 contains threaded groves (not shown) on its interior surface and is placed on the exterior surface 100 of the outlet aperture 58 of funnel assembly 22. The exterior surface of internal threaded insert 57 contains threads which engage the external threaded insert 59. An end opposite the threads of the internal threaded insert 57 includes a ridge 61. The ridge 61 protrudes slightly from the surface of internal threaded insert 57. This slight protrusion forms a raised surface or gasket ridge 61 on the bottom 60 of funnel assembly 22 which surrounds the outlet aperture 58.

Raised surface or gasket ridge 61 provides a reduced surface area which stopper 24 must contact. The reduced surface area allows stopper 24 to better occlude or otherwise seal outlet aperture 58, thereby stopping the flow of beverage 88 from funnel assembly 22. Further, the reduced surface area formed by raised surface or gasket ridge 61 allows for stopper 24 to be more easily displaced.

The internal threaded insert 57 is placed on the bottom 60 of funnel assembly 22 and passes from the interior surface 54 of funnel assembly 22 through the outlet aperture 58 of funnel assembly 22 and engages the corresponding threads of the external threaded insert 59. The threaded inserts 57 and 59 are then rotated to fully engage each other until a seal is formed by bringing the threaded inserts 57 and 59 into contact with the interior surface 54 and exterior surface 100 of the outlet aperture 58 of funnel assembly 22. The configuration of the fully engaged threaded inserts 57 and 59 form a generally rigid replaceable outlet aperture in the bottom 60 of funnel assembly 22. The replaceable nature of the threaded inserts 57 and 59 allow for easy replacement of the aperture should the raised surface or ridge 61 become worn or damaged.

It is contemplated that the threaded inserts 57 and 59 could be arranged in opposite orientation, having threads on the exterior surface of external threaded insert 59 and the interior of internal threaded insert. Additionally, threaded inserts 57 and 59 may also utilize other suitable means for fastening known to those of ordinary skill in the art.

The flow control assembly 20 of the present disclosure is attached to the basket 48 by attaching the couplers 42 thereto. With reference to FIG. 4, it can be seen that there are a pair of couplers 42 which attach to spaced apart portions of the basket 48. The flow control assembly 20 is retained within a gap 64 between a bottom of the basket 48 and an interior surface 54 of the bottom 68 of the funnel assembly 22.

FIG. 1 shows the flow control assembly 20 with the stopper 24 engaged to cover or otherwise occlude or block the outlet aperture 58. As a result, if beverage 88 drains into the bottom area 60 of the funnel assembly 22, the beverage will accumulate because the stopper 24 is closing or occluding the outlet aperture 58.

Turning to FIG. 3, the funnel assembly 22 has been positioned proximate to a beverage making apparatus or system 72. The apparatus 72 has a housing 74 of a generally known construction such that mounting structure or rails (not shown) are provided on an overhanging portion 76 of the housing 74. FIGS. 4 and 10 show extending flanges 77 on the funnel assembly 22 for engaging the rails which retain the funnel assembly 22 on the apparatus 72. In this regard, the funnel assembly 22 can be positioned in close proximity to a spray head assembly 78 of the apparatus 72. Positioning the funnel assembly 22 underneath the spray head assembly 78 allows for a spray of water 80 to be dispensed into a cavity 82 of the funnel assembly 22. As the water infuses the ground coffee or other beverage substance 56 retained in the funnel assembly 22, a beverage 88 is dispensed from and seeps through the filter paper 50 and drains towards the outlet aperture 58. As shown, a container 86 is positioned below the funnel assembly 22 to collect the beverage 88 drained from the funnel assembly 22. The container 86 may be in the form of a beverage carafe, a larger volume beverage container and server or any other version of a container for collecting beverage 88 dispensed from the funnel assembly 22.

Terms including brewed, brewing, brewing substance, brewing liquid, and brewed beverage as used herein are intended to be broadly defined as including but not limited to the brewing of coffee, tea and any other brewed beverage. This broad interpretation is also intended to include, but is not limited to any process of infusing, steeping, reconstituting, diluting, dissolving, saturating or pass a liquid through or otherwise mixing or combining a beverage substance with a liquid such as water without a limitation to the temperature of such liquid unless specified. This broad interpretation is also intended to include, but is not limited to beverage substances such as ground coffee, tea, liquid beverage concentrate, powdered beverage concentrate, freeze dried coffee or other beverage concentrates, to obtain a desired beverage or other food.

As shown in FIG. 3, the magnetic portion 26 of the flow control assembly 20 has been displaced from the position as shown in FIG. 1 and drawn downward 89, towards a magnetic actuator 90 shown in FIG. 3. As shown in FIG. 3, magnetic actuator 90 provides an attractive or repulsive structure 94 for magnetic portion 26. In this embodiment, attractive structure 94 draws the magnetic portion 26 downwardly 89 towards the magnetic actuator 90. The magnetic actuator 90 includes a holder portion 92 which can be attached to a portion of the apparatus 72 to position the attractive structure 94 retained thereon relative to the magnetic portion 26 of the flow control assembly 20. In this manner, when the funnel assembly 22 is positioned on the apparatus 72, the magnetic actuator 90, having the attractive structure 94 thereon, draws the magnetic portion 26 of the flow control assembly 20 downwardly 89 thereto. As the magnetic portion 26 is attracted to the magnetic actuator 90, the body 28 pivots about a pivot point 96 on the basket 48. The coupler 42 on the body 28 allows the flow control assembly 20 to pivot relative to the pivot point 96. As a result of the pivoting action of the body 28, the stopper 24 is displaced 97 from the outlet aperture 58 to allow beverage 88 in the funnel assembly 22 to drain through the outlet aperture 58.

Figure 11:
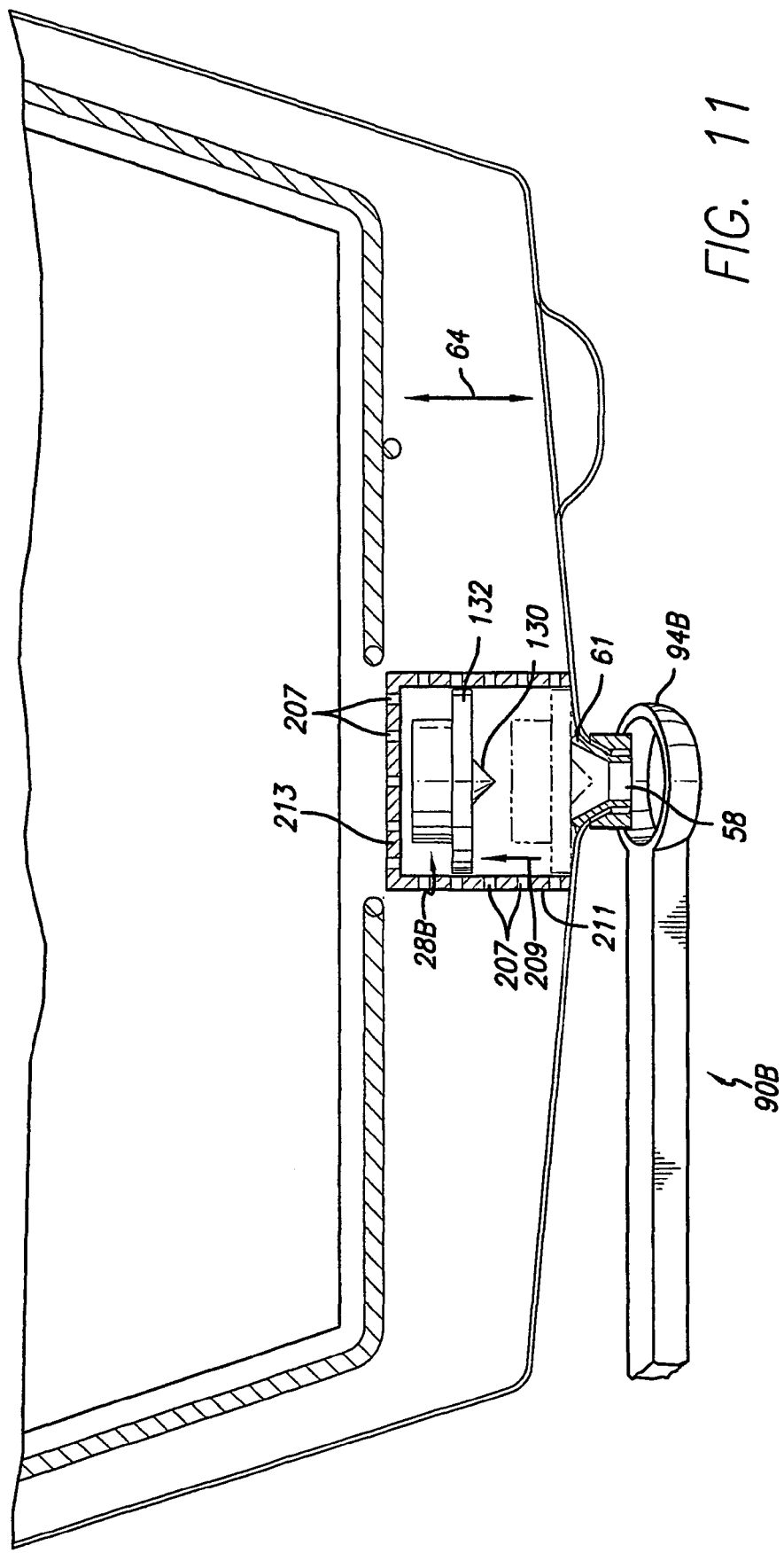
FIG. 11 is an enlarged cross-sectional view of another embodiment of the flow control assembly of FIG. 1 showing the stopper disengaged from the outlet aperture.

The foregoing general description of the present disclosure is directed to the embodiment as shown in FIGS. 1–6. It should be noted, that other forms of the flow control assembly as shown in FIGS. 1–6 can be devised to provide a similar or the same structure and function as the disclosure set forth in these FIGS. For example, FIGS. 7–10 show another embodiment of the flow control assembly 20a and FIGS. 11 and 12 show additional embodiments of the flow control assembly 20b and 20c. With reference to the other embodiments as shown in FIGS. 7–12, reference to similar structures will be made with the addition of the alphabetic suffix "a, b or c". Structures which are identical will be referred to with the same reference number as shown in FIGS. 1–6.

Figure 7:
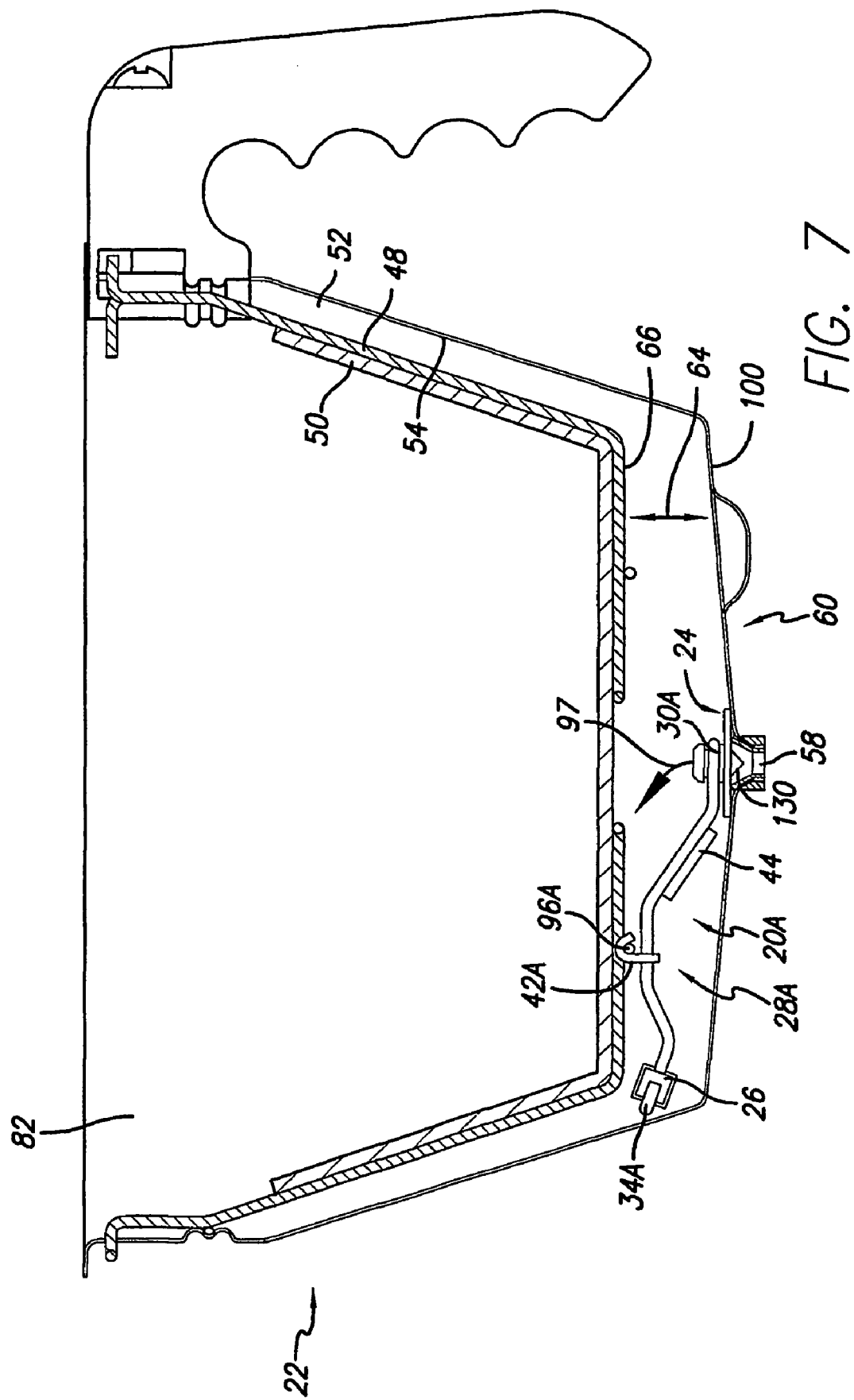
FIG. 7 is a side-elevational, cross-sectional view similar to that as shown in FIG. 1 in which another embodiment of the flow control assembly is provided.

As shown in FIG. 7, the flow control assembly 20a is mounted in a similar manner to the basket 48 of the funnel assembly 22. The flow control assembly 20a includes the stopper 24 and the magnetic portion 26. The structure of the body 28a is slightly different than that as shown in FIGS. 1–6. In this regard, reference is made to FIGS. 8 and 9 to illustrate that the body 28a is formed from a rod material. As shown, the body 28a includes a magnet mount 34a and a stopper mount 30a. Coupler 42a is formed in or attached to the body 20a.

It should be noted that the body 28a can also be formed of a generally rigid resilient material such as metal or plastic. In this regard, the strip of metal or plastic can be stamped or molded in the desired shape to provide the appropriate clearances and dimensions for operation thereof. As shown in FIGS. 8 and 9, the magnet mount 34 and stopper mount 30 are curved sections of the respective magnet end 36 and stopper end 38.

Similar to the embodiment shown in FIGS. 1–6, the magnet mount 34a and stopper mount 30a shown in FIGS. 8 and 9 provide passages 105a, 107a to allow the magnetic portion 26 and stopper 24 to be respectively snapped into position therein. Similarly, the magnetic portion 26 and stopper 24 could be molded into position on the respective ends 36, 32 of a metallic version or as part of the molded assembly of a plastic version.

The flow control assembly 20, 20a shown in the FIGS. can be easily attached to the basket 48. Similarly, flow control assemblies 20, 20a include radii and dimensions which generally comply with the requirements for the National Sanitation Foundation. The couplers 42, 42a allow the flow control assembly 20, 20a to be quickly and easily attached to and removed from the basket 48 without the use of tools. As such, the flow control assembly 20, 20a can be captivly retained within the funnel assembly 22 on the basket 48 to selectively engage and disengage the stopper 24 from the outlet aperture 58. A cross-member 99 provides a stop to limit the rotation of the magnet portion end 36 of the flow control assembly 20 to prevent rotation of the magnetic portion 26 upwardly through a space in neighboring ribs 101, 103 (see FIG. 10).

Yet another alternative embodiment of the flow control assembly 20 is shown in FIGS. 11 and 12. In this embodiment, FIG. 11 shows stopper 24b formed of a magnetic material. The flange 132 of stopper 24b having centering portion 130 may be formed of or coated in silicone or any other suitable material for engaging ridge 61 to prevent the flow of beverage 88 from funnel assembly 22. As shown in FIG. 12, it is also contemplated that a separate stopper 24c may be attached to a separate magnetic body 201.

As shown in FIGS. 11 and 12 the retainer 28b is a foraminous structure. FIGS. 11 and 12 show embodiments of flow control assembly 20b, 20c where stoppers 24b, 24c are captivly retained in the area proximate to the outlet aperture 58 within the foraminous structure 28b having a generally vertical surface 211 and a top surface 213. The generally vertical surface 211 of the foraminous structure 28b contains at least one and preferably a plurality of openings 207 through which beverage 88 can flow. The top surface 213 may also contain a plurality of openings 207. It is also contemplated that the foraminous structure 28b not have discrete openings but may be mounted over the outlet aperture 58 on feet which create a gap through which beverage 88 may flow.

While it is contemplated that other shapes may be suitable, the foraminous structure 28b as shown in FIGS. 11 and 12 is of a generally cylindrical shape having an internal diameter slightly larger than the outside diameter of the flange 132 of stopper 24b, 24c. The slightly larger internal diameter of the foraminous structure 28b allows stopper 24b, 24c to maintain a desired orientation relative to outlet aperture 58 when it is displaced 209 from the outlet aperture 58.

The foraminous structure 28b is attached to the bottom 60 interior surface 54 of funnel assembly 22 proximate to the outlet aperture 58. The foraminous structure 28b is dimensioned to fit within the gap 64 between the basket 48 and the bottom 60 of the funnel assembly 22 generally without interfering with the engagement of the basket 48 and the funnel assembly 22.

When displaced 209 from the outlet aperture 58, the stopper 24b, 24c moves within the foraminous structure 28b away from outlet aperture 58 and is retained within foraminous structure 28b by top surface 213. After the stopper 24b, 24c is displaced from outlet aperture 58, beverage 88 may freely flow through the plurality of openings 207 and out outlet aperture 58.

In order to displace stopper 24b, 24c from outlet aperture 58 a magnetic actuator 90b, 90c is employed. As shown in FIG. 11, magnetic actuator 90b is located proximate to and slightly below outlet aperture 58. Magnetic actuator 90b has repulsive structure 94b which is located beneath the outlet aperture 58. Repulsive structure 94b may be a magnet or an electromagnet. Repulsive structure 94b may be dimensioned to contain an aperture through which fluid leaving the outlet aperture 58 may flow. In the alternative, repulsive structure 94b may be dimensioned to form an arc, semi-circle, or other shape which partially surrounds outlet aperture 58.

It is also contemplated that magnetic actuator 90b may alternatively be located proximate to outlet aperture 58 as opposed to directly under outlet aperture 58. In this position, repulsive structure 94b would not need to contain an aperture.

It is further contemplated that repulsive structure 94b of magnetic actuator 90b may be located on the bottom 60 external surface 100 of funnel assembly 22. In this orientation, holder portion 92b would not be needed.

In either location, when magnetic actuator 90b is activated, a repulsive magnetic force relative to stopper 24b is generated. The magnetic force from magnetic actuator 90b displaces stopper 24b from outlet aperture 58 and causes stopper 24b to move within the foraminous structure 28b away from outlet aperture 58 where it is retained within foraminous structure 28b by top surface 213.

FIG. 12 shows magnetic actuator 90c. In this position, magnetic actuator 90c is shown located proximate to spray head assembly 78. It is contemplated that magnetic actuator 90c may alternatively be located on basket 48. The attractive structure 94c on magnetic actuator 90c may be a magnet or an electromagnet. When engaged, magnetic actuator 90c generates an attractive magnetic force relative to the stopper 24c. The magnetic force from magnetic actuator 90c displaces stopper 24c from outlet aperture 58 and causes stopper 24c to move within foraminous structure 28b away from outlet aperture 58 towards basket 48 where it is retained within foraminous structure 28b by top surface 213.

As an additional consideration, the present disclosure may be retrofitted onto existing funnel assemblies 22 and brewing systems 72. For example, the flow control assembly 20, 20a can be attached to an existing basket 48 retained in an existing funnel assembly 22. Similarly, the magnetic actuator 90 can be attached to a corresponding housing 74 of a brewing system 72 to position the attractive structure 94 in appropriate proximity to attract the magnetic portion 26 of the flow control assembly 20, 20a.

As an additional consideration, it is envisioned that the flow control assembly 20, 20a of the present disclosure can be attached to the exterior surface 100 of the funnel assembly 22. In this regard, the magnetic portion 26 can be positioned to engage and disengage the corresponding stopper 24 attached to the flow control assembly 20, 20a to open and close the outlet aperture 58 from outside of funnel assembly 22. Based on the information disclosed herein, one of ordinary skill in the art, using the teachings as provided herein, would be able to provide a pivot point 96 on the exterior surface 100 of the funnel assembly 22 to allow the flow control assembly 20, 20a to pivot relative to the outlet aperture 58.

Turning to FIGS. 3, 11 and 12 the present disclosure envisions a system which will also allow control of the magnetic actuator 90, 90b, 90c to open and close the outlet aperture 58 to intermittently drain beverage 88 from the funnel assembly 22. In these embodiments, the attractive structures 94, 94b, 94c of magnetic actuators 90, 90b, 90c are electromagnets connected via line 102 to a controller 104. The controller can respond by sending a pre-programmed series of activations to the magnetic actuator 90, 90b, 90c or can operate in response to other control devices which generate unique predetermined signals. For example, a pause button 108 can be provided on the brewing system 72 connected via line 110 to the controller 104. The pause button 108 could operate the controller 104 to activate and deactivate magnetic actuator 90, 90b, 90c. In this manner, the deactivation of the magnetic actuator 90, 90b, 90c would cause the stopper 24, 24b, 24c to close the outlet aperture 58. As a result, a user could then remove the container 86 from beneath the funnel assembly 22 without continuous dripping of beverage 88 from the funnel assembly 22. The pause button 108 might need to be reactivated in order to activate the magnetic actuator 90, 90b, 90c to disengage the stopper 24, 24b, 24c from the outlet aperture 58.

The controller 104 may also be coupled via line 112 to a container sensor 114 or other device such as a switch which is attached the brewing system 72. A corresponding device 116 could be attached the container 86. The sensing by the container sensor, 114 of device 116 in close proximity, may provide a unique signal or absence of a signal over line 112 to the controller 104 to indicate that magnetic actuator 90, 90b, 90c should be actuated to open the outlet aperture 58. This would allow beverage 88 to drain from the funnel assembly 22 into the container 86 when it is present. If the container 86 is moved such that the container sensor 114 no longer detects device 116 in close enough proximity, the container sensor may provide a separate unique signal or absence of a signal over line 112 to the controller 104, the controller 104 may then activate the magnetic actuator to disengage the magnetic portion 26 thereby causing stopper 24, 24b, 24c to close or occlude the outlet aperture 58. This would cause the brewed beverage 88 to stop draining from the funnel assembly 22 when the container 86 is removed from beneath the funnel assembly 22.

It is further contemplated that the container sensor 114 may also detect different types of devices 116 or other attributes of the container such as color, shape, size, or texture. It is envisioned that any detectable attribute may be used. The different devices 116 or attributes detected by container sensor 114 may be communicated down line 112 to controller 104 which may interpret the signal to indicate the presence of a certain type of container 86, which indicates the corresponding type of beverage 88 to be produced. For instance, different types of coffees or teas can be indicated by the container 86 into which they will be produced. The controller 104 then can send a preprogrammed series of signals over line 102 to activate and deactivate the magnetic actuator 90, 90b, 90c, thereby causing the stopper 24, 24b, 24c to open or close the outlet aperture 58 at preprogrammed times.

This preprogrammed opening and closing of outlet aperture 58 will allow for steep times to be individually set or preprogrammed for a variety of brewed beverages. Additionally the preprogrammed opening and closing of outlet aperture 58 could allow for the brewing system to temporarily cease operation in response to certain specified conditions. For example, when a predetermined temperature of water used in the brewing process is reached or is no longer present, when a predetermined volume of water remains in the brewing system, when the current brewing cycle has ended, or any other condition in which cessation of the brewing process would be desirable.

It is also contemplated that the controller 104 may be in communication with a controllable valve 120 over line 124.

The controllable valve may be a solenoid valve, pinch valve, or any other suitable structure known to those of skill in the art. The controllable valve 120 may be provided at a predetermined location on a fluid delivery system 122 associated with the spray head assembly 78. The controllable valve may be coupled over line 124 to the controller 104. In this manner, the controllable valve 120 could also be operated in response to any one of the variety of signals described herein. For example, if the pause button 108 is activated, the controller 104 can control the magnetic actuator 90 as well as the controllable valve 120. The controller 104 may be preprogrammed such that if the brew cycle has achieved a certain period of time or quantity of water dispensed into the funnel assembly 22, the controllable valve 120 may remain open or closed. This would be useful in a situation where the remaining time or quantity of water to be dispensed into the funnel assembly 22 would be greater than the volume of the funnel assembly 22 thereby preventing overflowing of the funnel assembly 22.

Alternatively, the controllable valve could also be operated anytime a second sensor 151 communicated a signal down second sensor line 153 to controller 104. As shown in FIG. 3, the second sensor 151 is located proximate to funnel assembly 22. The second sensor 151 is capable of sensing the level of fluid 157 in the funnel assembly 22. The second sensor 151 can be for example, an optical, acoustical, conductive, thermal or any other sensor suitable to detect a level of fluid 157.

Also, the controllable valve 120 could be operated so as to further enhance the pulsing or steeping functions described herein. The controllable valve 120 and the magnetic actuator 90 may be controlled by the controller 104 in combination with one another to achieve a variety of desired preprogrammed brewing and steeping times as determined by the container sensor 114 in response to the type of devices 116 or attributes detected on the container 86.

Further, it is contemplated that the controller 104 may operate the controllable valve 120 and the magnetic actuator 90, 90b, 90c in combination with one another in response to a manual control apparatus 159. It is envisioned that the manual control apparatus 159 may be in the form of a push button, a rocker switch, a multi position rotational switch, a numeric keypad, or any other manual control known to those of skill in the art. Through the use of the manual control apparatus 159, a user may select the type of beverage to be brewed by the brewing system 72. After the user makes a selection, the manual control apparatus 159 may send a signal over line 161 to controller 104. Controller 104 then may operate controllable valve 120 and the magnetic actuator 90, 90b, 90c in combination with one another to achieve the desired preprogrammed brewing and steeping times.

The present disclosure in any of its forms still results in the flow control assembly 20, 20a, 20b, 20c closing the outlet aperture 58 of funnel assembly 22 when the magnetic portion 26 is moved relative to magnetic actuator 90. For example, at the end of a brew cycle the funnel assembly 22 must be removed from the brewing system 72 to empty and replace the spent brewing beverage brewing substance 56. The present disclosure prevents the funnel assembly 22 from dripping when it is removed from the brewing system 72 while the spent beverage brewing substance is removed and the funnel assembly 22 refilled.

The stopper 24 is formed of a suitable, flexible material which can take any of a variety of forms. As shown in the FIGS., the stopper 24 includes a centering portion 130 and an outlying flange 132. The outlying flange 132 extends over the partially, conically shaped outlet aperture 58. It is also envisioned that the outlying flange 132 may be dimensioned to occlude the outlet aperture 58 by fitting snugly therein. The magnetic portion 26 is encapsulated in a suitable food grade plastic material such as Santoprene to seal it from the food substances retained within the funnel assembly 22.

Applicants have provided descriptions and FIGS. which are intended as an illustration of certain embodiments of the present disclosure. The disclosure of the FIGS. and descriptions thereof are not intended to be construed as containing or implying limitation of the invention to those embodiments. Though we appreciate that, although applicant has described various aspects of the invention with respect to specific embodiments, various alternatives and modifications will be apparent from the present disclosure which are within the scope and spirit of the present disclosure as set forth herein.

We claim:

1. A flow control assembly in combination with a beverage brewing funnel assembly for use with a beverage making system, the combination comprising:
   a funnel assembly to brew a beverage, the funnel assembly including an outer wall having an interior surface and an exterior surface, and further including a basket retained in the funnel assembly and spaced from the outer wall;
   a gap located between a bottom of the basket and the interior surface of the funnel assembly;
   an aperture in a bottom of the outer wall;
   a flow control assembly to control a flow of the brewed beverage, the flow control assembly including a magnetically-sensitive portion and a stopper portion mounted on a retainer, the retainer located in the gap, and the magnetically-sensitive portion configured to be controllable to position the stopper portion to open and close the aperture; and
   a magnetic actuator located external to the funnel assembly to control movement of the magnetically-sensitive portion of the flow control assembly.

2. The combination of claim 1 wherein the retainer is a lever arm onto which the stopper portion and the magnetically-sensitive portion are attached.

3. The combination of claim 1 wherein the magnetic actuator is located below the aperture.

4. The combination of claim 1 wherein the stopper portion is removable.

5. The combination of claim 1 wherein the magnetically-sensitive portion is removable.

6. The combination of claim 1 further comprising a counterweight on the flow control assembly.

7. The combination of claim 1 wherein the flow control assembly is of a unitary construction.

8. The combination of claim 1 further comprising a gasket attached to an interior of the funnel assembly and surrounding the aperture.

9. The combination of claim 8 wherein the gasket is a two member structure dimensioned such that a first member forming the gasket on an interior of the funnel assembly passes through the aperture to engage a second member which is retained on an exterior of the aperture.

10. The combination of claim 1 wherein the magnetic actuator is an electromagnet.

11. The combination of claim 1 further comprising a controller to activate and deactivate the magnetic actuator.

12. The combination of claim 11 wherein the controller is manually controllable to allow an operator to selectively operate the flow control assembly.

13. The combination of claim 1 further comprising a fluid delivery system to deliver fluid to the funnel assembly; and
a controllable valve coupled to the controller and the fluid delivery system, the controllable valve being controlled by the controller in combination with the flow control assembly.

14. The combination of claim 11 wherein the controller operates the controllable valve in combination with the flow control assembly in response to at least one predetermined signal.

15. The combination of claim 1 further comprising a fluid-level sensor in communication with the controller, the fluid-level sensor configured to detect a level of fluid in the funnel assembly.

16. The combination of claim 13 further comprising a container sensor coupled to the controller to detect the presence or absence of a beverage container, the controller at least operating the flow control assembly to a closed position when the container sensor indicates a container is not present.

17. The combination of claim 16 wherein the controller at least operates the controllable valve to a closed position when the container sensor indicates a container is not present.

18. The combination of claim 16 wherein the container sensor is configured to detect different types of beverage containers by differentiating between at least one predetermined attribute associated with a particular type of beverage container, the container sensor being capable of generating a signal dependent upon the type of beverage container sensed, and transmitting the signal to the controller.

19. A flow control assembly in combination with a beverage brewing funnel assembly for use with a beverage making system, the combination comprising:
a funnel assembly to brew a beverage, the funnel assembly including an outer wall having an interior surface and an exterior surface, and further including a basket retained in the funnel assembly and spaced from the outer wall;
a gap located between a bottom of the basket and the interior surface of the funnel assembly;
an aperture in a bottom of the outer wall;
a flow control assembly to control a flow of the brewed beverage, the flow control assembly including a magnetically-sensitive portion and a stopper portion mounted on a retainer, the retainer mounted to the basket, and the magnetically-sensitive portion configured to be controllable to position the stopper to open and close the aperture; and
a magnetic actuator located external to the funnel assembly to control movement of the magnetically-sensitive portion of the flow control assembly.

20. The combination of claim 19, wherein the magnetic actuator is located below the aperture.

21. The combination of claim 19, wherein the stopper portion is removable.

22. The combination of claim 19, wherein the magnetically-sensitive portion is removable.

23. The combination of claim 19, further comprising a counterweight located on the flow control assembly.

24. The combination of claim 19, wherein the flow control assembly is of a unitary construction.

25. A flow control assembly in combination with a beverage brewing funnel assembly for use with a beverage making system, the combination comprising:
a funnel assembly to brew a beverage, the funnel assembly including an outer wall having an interior surface and an exterior surface, and further including a basket retained in the funnel assembly and spaced from the outer wall;
a gap located between a bottom of the basket and the interior surface of the funnel assembly;
an aperture in a bottom of the outer wall;
a flow control assembly to control the flow of the brewed beverage, the flow control assembly including a magnetically-sensitive stopper movable within a retainer, the retainer including a plurality of openings on at least two surfaces, and the magnetically-sensitive stopper configured to be controllable to be moved to open and close the aperture; and
a magnetic actuator located adjacent the retainer to control movement of the magnetically-sensitive stopper.

26. The combination of claim 25 wherein the magnetic actuator is attached to the funnel assembly.

27. The combination of claim 25, wherein the magnetic actuator is located below the aperture.

28. The combination of claim 25, wherein the flow control assembly is of a unitary construction.

29. The combination of claim 25, wherein the magnetic actuator is an electromagnet.

30. The combination of claim 25, further comprising a controller to activate and deactivate the magnetic actuator.

31. The combination of claim 30, wherein the controller is manually controllable to allow an operator to selectively operate the flow control assembly.

32. The combination of claim 25, further comprising a fluid delivery system to deliver fluid to the funnel assembly; and
a controllable valve coupled to the controller and the fluid delivery system, the controllable valve being controlled by the controller in combination with the flow control assembly.

33. The combination of claim 30, wherein the controller operates the controllable valve in combination with the flow control assembly in response to at least one predetermined signal.

34. The combination of claim 25, further comprising a fluid-level sensor in communication with the controller, the fluid-level sensor configured to detect a level of fluid in the funnel assembly.

35. The combination of claim 32, further comprising a container sensor coupled to the controller to detect the presence or absence of a beverage container, the controller at least operating the flow control assembly to a closed position when the container sensor indicates a container is not present.

36. The combination of claim 35, wherein the controller at least operates the controllable valve to a closed position when the container sensor indicates a container is not present.

37. The combination of claim 35, wherein the container sensor is configured to detect different types of beverage containers by differentiating between at least one predetermined attribute associated with a particular type of beverage container, the container sensor being capable of generating a signal dependent upon the type of beverage container sensed, and transmitting the signal to the controller.

38. A method for controlling a brewed beverage fluid flow from a funnel assembly, the method steps comprising:
providing a funnel assembly including an outer wall having an interior surface and an exterior surface, and further including a basket retained in the funnel assembly and spaced from the outer wall, the funnel assembly having a gap located between a bottom of the basket and the interior surface of the funnel assembly and an aperture in a bottom of the outer wall;

providing a flow control assembly including a magnetically-sensitive portion and a stopper portion mounted to a retainer located in the gap, the magnetically-sensitive portion configured to be controllable to position the stopper portion to open and close the aperture; and providing a magnetic actuator proximate the magnetic portion to control movement of the stopper portion to open and close the aperture and controlling the brewed beverage fluid flow.

* * * * *